US008428158B2

(12) United States Patent
Maltsev et al.

(10) Patent No.: US 8,428,158 B2
(45) Date of Patent: Apr. 23, 2013

(54) METHOD FOR CHANNEL ESTIMATION USING RECURSIVE FILTERING AND MULTICARRIER RECEIVER WITH INTERFERENCE-AWARE DEMODULATION

(75) Inventors: Alexander Alexandrovich Maltsev, Nizhny Novgorod (RU); Andrey Vyacheslavovich Pudeyev, Nizhny Novgorod (RU); Alexey Evgenievich Rubtsov, Nizhny Novgorod (RU); Vadim Sergeyevich Sergeyev, Nizhny Novgorod (RU); Sergey Alexanderovich Tiraspolsky, Nizhny Novgorod (RU); Alexei Vladimirovich Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 12/281,049

(22) PCT Filed: Mar. 16, 2006

(86) PCT No.: PCT/RU2006/000120
§ 371 (c)(1),
(2), (4) Date: Aug. 28, 2008

(87) PCT Pub. No.: WO2007/105980
PCT Pub. Date: Sep. 20, 2007

(65) Prior Publication Data
US 2009/0052566 A1    Feb. 26, 2009

(51) Int. Cl.
*H04K 1/10*    (2006.01)
(52) U.S. Cl.
USPC ............................................................ 375/260
(58) Field of Classification Search .................. 375/260, 375/350, 219, 355, 371; 455/452.2, 450, 455/461; 370/343, 310, 329, 478
See application file for complete search history.

(56) References Cited

U.S. PATENT DOCUMENTS

| 5,926,455 | A | * | 7/1999 | Allpress ........................ 370/210 |
| 6,144,711 | A | | 11/2000 | Raleigh et al. |
| 6,792,057 | B2 | * | 9/2004 | Kabel et al. .................... 375/346 |
| 6,834,043 | B1 | * | 12/2004 | Vook et al. ..................... 370/310 |
| 2002/0105928 | A1 | | 8/2002 | Kapoor et al. |
| 2002/0150065 | A1 | | 10/2002 | Ponnekanti |
| 2004/0008760 | A1 | * | 1/2004 | Dogan .......................... 375/219 |
| 2004/0176097 | A1 | * | 9/2004 | Wilson et al. .............. 455/452.2 |
| 2004/0218702 | A1 | | 11/2004 | Denk |

(Continued)

FOREIGN PATENT DOCUMENTS

| WO | WO-02082683 A2 | 10/2002 |
| WO | WO-2007091908 A1 | 8/2007 |
| WO | WO-2007105980 A1 | 9/2007 |

OTHER PUBLICATIONS

McGuire, M., et al., "Low-Order Kalman Filters for Channel Estimation", *Communications, Computers and Signal Processing, 2005*, Pacrim. 2005 IEEE Pacific Rim Conference on Victoria, BC, Canada, (Aug. 2005), 352-355.

(Continued)

*Primary Examiner* — Sam K Ahn
*Assistant Examiner* — Shawkat M Ali
(74) *Attorney, Agent, or Firm* — Schwegman, Lundberg & Woessner, P.A.

(57) ABSTRACT

Embodiments of a multicarrier receiver with interference-aware demodulation and methods for channel estimation using recursive filtering in wireless networks are generally described herein. Other embodiments may be described and claimed. In some embodiments, orders of a recursive filter are allocated to track a main channel and one or more interfering channels to generate channel estimates.

22 Claims, 6 Drawing Sheets

CHANNEL ESTIMATOR

U.S. PATENT DOCUMENTS

| | | | |
|---|---|---|---|
| 2005/0096061 A1* | 5/2005 | Ji et al. | 455/450 |
| 2005/0122998 A1* | 6/2005 | Kamerman et al. | 370/478 |
| 2005/0135324 A1* | 6/2005 | Kim et al. | 370/343 |
| 2005/0175078 A1 | 8/2005 | Redfern | |
| 2005/0277425 A1 | 12/2005 | Niemela et al. | |
| 2006/0013340 A1* | 1/2006 | Reid | 375/340 |
| 2006/0019694 A1* | 1/2006 | Sutivong et al. | 455/522 |
| 2007/0110020 A1* | 5/2007 | Kroeger et al. | 370/343 |
| 2010/0150079 A1 | 6/2010 | Maltsev et al. | |
| 2012/0281676 A1 | 11/2012 | Ma et al. | |

OTHER PUBLICATIONS

"Chinese Application Serial No. 200680052928.8, Non Final Office Action mailed Apr. 13, 2011", 6 pgs.

"U.S. Appl. No. 12/278,368, Final Office Action mailed Dec. 11, 2012", 14 pgs.

"U.S. Appl. No. 12/278,368, Non Final Office Action mailed Jul. 25, 2012", 13 pgs.

"U.S. Appl. No. 12/278,368, Preliminary Amendment filed Aug. 5, 2008", 3 pgs.

"U.S. Appl. No. 12/278,368, Response filed Oct. 12, 2012 to Non Final Office Action mailed Jul. 25, 2012", 14 pgs.

"Chinese Application Serial No. 200680052928.8, Office Action mailed Jul. 5, 2012", 4 pgs.

"Chinese Application Serial No. 200680052928.8, Response filed Sep. 19, 2012 to Office Action mailed Jul. 5, 2012", 14 pgs.

\* cited by examiner

FIG. 3
CHANNEL ESTIMATOR

METHOD FOR CHANNEL ESTIMATION USING RECURSIVE FILTERING AND MULTICARRIER RECEIVER WITH INTERFERENCE-AWARE DEMODULATION

This application is a U.S. National Stage Filing under 35 U.S.C. 371 from International Application No. PCT/RU2006/000120, filed Mar. 16, 2006 and published in English as WO 2007/105980 on Sep. 20, 2007, which application and publication is incorporated herein by reference in their entireties.

TECHNICAL FIELD

Some embodiments of the present invention pertain to wireless communication systems. Some embodiments of the present invention pertain to wireless networks such as broadband wireless access (BWA) networks. Some embodiments of the present invention pertain to interference cancellation in multicarrier receivers, such as orthogonal frequency division multiplexed (OFDM) receivers.

BACKGROUND

A mobile station's ability to receive and process signals from a serving base station may be affected by interfering signals, particularly interfering signals from other base stations that use the same frequency subcarriers. In the case of BWA networks, different base stations of a BWA network may be time-synchronized and may concurrently transmit downlink (DL) frames to their associated mobile stations using the same subcarriers of a multiplexing scheme such as orthogonal frequency division multiple access (OFDMA). This makes it difficult for a mobile station operating in the presence of other (i.e., interfering) base stations to receive and process signals from a serving base station.

Another issue with BWA networks is Doppler-induced inter-carrier-interference (ICI) which is interference between adjacent subcarriers. Doppler-induced ICI may be caused by the speed at which the channel varies over time as well as velocity of the mobile station. Doppler-induced ICI makes it difficult to decode signals received from a serving base station.

Thus, there are general needs for receivers that can operate in the presence of interfering base stations and methods for reducing and/or canceling interference from other base stations, as well as receivers that can cancel and/or reduce Doppler-induced ICI.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1A:
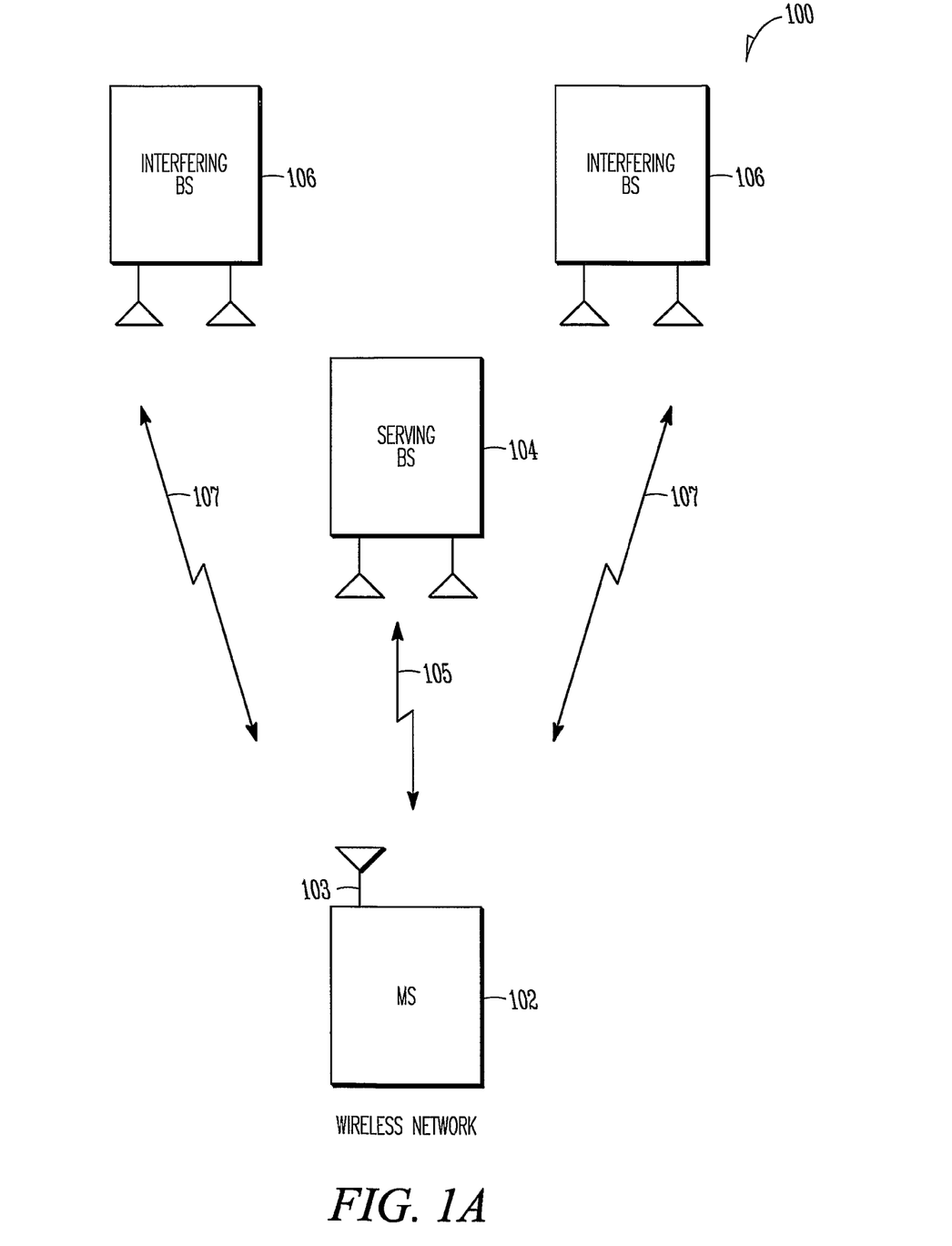
FIG. 1A illustrates a wireless network in accordance with some embodiments of the present invention.

FIG. 1A illustrates a wireless network in accordance with some embodiments of the present invention. Wireless network 100 includes mobile station (MS) 102, serving base station (BS) 104 and one or more interfering base stations (BS) 106. Interfering base stations 106 and serving base station 104 may be neighboring base stations. Mobile station 102 and serving base station 104 communicate over main channel 105. Interfering base stations 106 may communicate with other mobile stations (not illustrated) within the same frequency spectrum used by mobile station 102 and serving base station 104. Serving base station 104 and interfering base stations 106 may use the same set of subcarriers for their communications. Interfering signals from interfering base stations 106 may be received by mobile station 102 through interfering channels 107. In some embodiments, wireless network 100 may be a BWA network, although the scope of the invention is not limited in this respect.

In accordance with some embodiments of the present invention, mobile station 102 may receive signals through antenna 103 and may significantly decrease, and even substantially cancel, the interference from one or more interfering base stations 106 by applying appropriate weights to individual subcarriers of the received signals. In some embodiments, mobile station 102 performs a recursive filtering process to generate and update channel estimates for main channel 105 and one or more interfering channels 107 on a symbol-by-symbol basis for use in generating the weights.

In some embodiments, mobile station 102 may identify interfering base stations 106 that are considered to be significant interferers based on an identifier in a preamble symbol. In some embodiments, mobile station 102 may generate subcarrier modulation sequences used by interfering base stations 106 identified to be significant interferers.

In some embodiments, mobile station 102 may use a recursive filtering process to recursively generate and/or update channel estimates for main channel 105 and interfering channels 107 on a symbol-by-symbol basis for each pilot subcarrier. In some embodiments, mobile station 102 may use pilot subcarrier modulation sequences for both serving base station 104 and interfering base stations 106 to generate and/or update the channel estimates. In some embodiments, the recursive filtering process may also use the signals received on the pilot subcarriers to recursively generate and update the channel estimates for each data symbol of an OFDMA frame.

In some embodiments, mobile station 102 may calculate an interference correlation matrix on a symbol-by-symbol basis for each pilot subcarrier from the channel estimates for main channel 105 and the channel estimates for interfering channels 107. In some embodiments, mobile station 102 may also calculate weights on a symbol-by-symbol basis for each pilot subcarrier based on the interference correlation matrix and the channel estimates for main channel 105. In some embodiments, mobile station 102 may interpolate the weights for each pilot subcarrier to generate weights for each data subcarrier. These embodiments are described in more detail below.

In some embodiments, mobile station 102 may generate channel estimates for use in equalizing orthogonal frequency division multiplexed (OFDM) signals. In these embodiments, mobile station 102 may include a channel estimator which may allocate two or more orders (i.e., dimensions) of a recursive filter to track main channel 105 with serving base station 104. In these embodiments, the channel estimator may allocate additional orders of the recursive filter to track the most significant one or more interfering channels 107. The recursive filter may perform symbol-by-symbol recursive filtering on pilot subcarriers of a received signal to generate a channel estimate on a symbol-by-symbol basis for the main channel for each of the pilot subcarriers. In some embodiments, orders of the recursive filter may refer to a number of matrix dimensions in which the recursive filter is configured to process. These embodiments are discussed in more detail below.

In some interference-aware embodiments, the channel estimates for main channel 105 and the channel estimates for interfering channels 107 may be applied during symbol demodulation to generate bit metrics for each subcarrier. In these embodiments, the bit metrics may represent probabilities for predetermined bit values (e.g., a one or a zero) influenced by both the channel estimates for main channel 105 and the channel estimates for interfering channels 107. These embodiments are also discussed in more detail below.

In some embodiments, mobile station 102 may, at least in part, cancel Doppler-induced ICI between the subcarriers of the received signals. In these embodiments, a channel derivate estimate may be generated by the channel estimator for each subcarrier based on differences between the channel estimates for sequential symbols of a frame. The channel derivate estimate may be applied to channel-equalized frequency-domain signals for each subcarrier to reduce and/or substantially cancel any Doppler-induced ICI between the subcarriers. These embodiments are also discussed in more detail below.

Figure 1B:
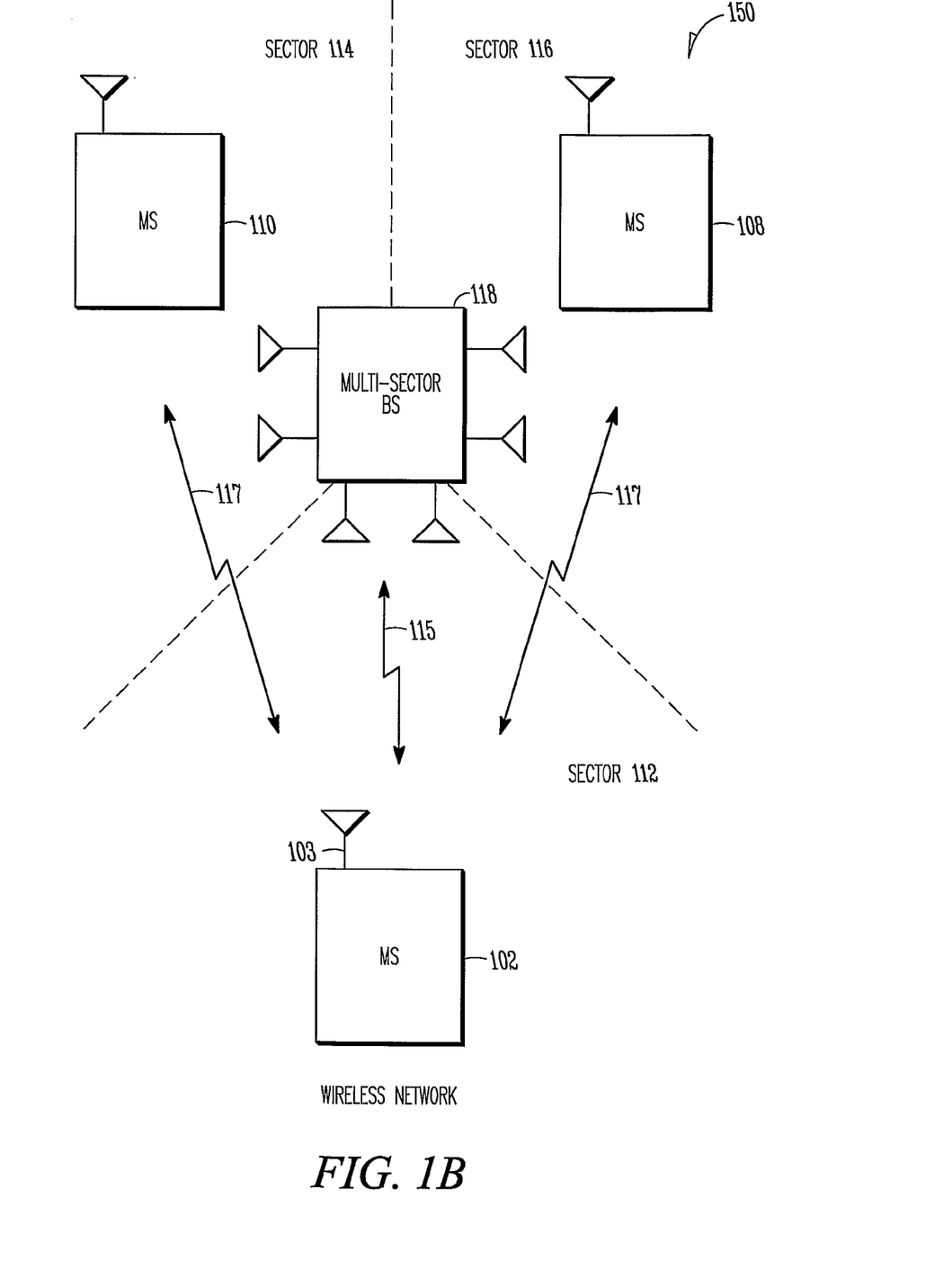
FIG. 1B illustrates a wireless network with a multi-sector base station in accordance with some embodiments of the present invention.

FIG. 1B illustrates a wireless network with a multi-sector base station in accordance with some embodiments of the present invention. Wireless network 150 includes multi-sector base station 118 and a plurality of mobile stations, illustrated generally as mobile stations 102, 108 and 110. Multi-sector base station 118 provides wireless network communications within a plurality of sectors, such as sectors 112, 114 and 116, using the same frequency spectrum, and in some embodiments, using the same set of subcarriers. In these embodiments, multi-sector base station 118 communicates with mobile station 102 in sector 112, multi-sector base station 118 communicates with mobile station 108 in sector 116, and multi-sector base station 118 communicates with mobile station 110 in sector 114. In these embodiments, multi-sector base station 118 communicates with mobile station 102 over main channel 115, and multi-sector base station 118 communicates with mobile stations 108 and 110 over other channels (not illustrated). The communications between multi-sector base station 118 and mobile stations 108 and 110 may generate interfering channels 117 between mobile station 102 and multi-sector base station 118. In some embodiments, wireless network 150 may be a BWA network, although the scope of the invention is not limited in this respect.

In some multi-sector embodiments, preamble symbols of frames transmitted to mobile stations of different sectors may use different sets of subcarriers, while the data portions of the frames may use the same subcarriers. In some multi-sector embodiments, multi-sector base station 118 may use one of three orthogonal sets of subcarriers for transmitting preamble symbols within each sector, although the scope of the invention is not limited in this respect.

In these multi-sector embodiments, multi-sector base station 118 may use every third subcarrier for transmitting preamble symbols in a particular sector, although the scope of the invention is not limited in this respect. Because different sets of subcarriers may be used by multi-sector base station 118 in each sector, a channel estimator of mobile station 102 may generate an initial channel estimate for main channel 115 as well as generate initial channel estimates for interfering channels 117 using the preamble symbols, although the scope of the invention is not limited in this respect. These initial channel estimates may be used to initialize the recursive filter, as described in more detail below.

In these multi-sector embodiments, mobile station 102 shown in FIG. 1B may correspond to mobile station 102 (FIG. 1A). Multi-sector base station 118 may also be a serving base station, such as base station 104 (FIG. 1A). Interfering channels 117 may correspond to interfering channels 107 (FIG. 1A), and main channel 115 may correspond to main channel 105 (FIG. 1A).

Figure 2:
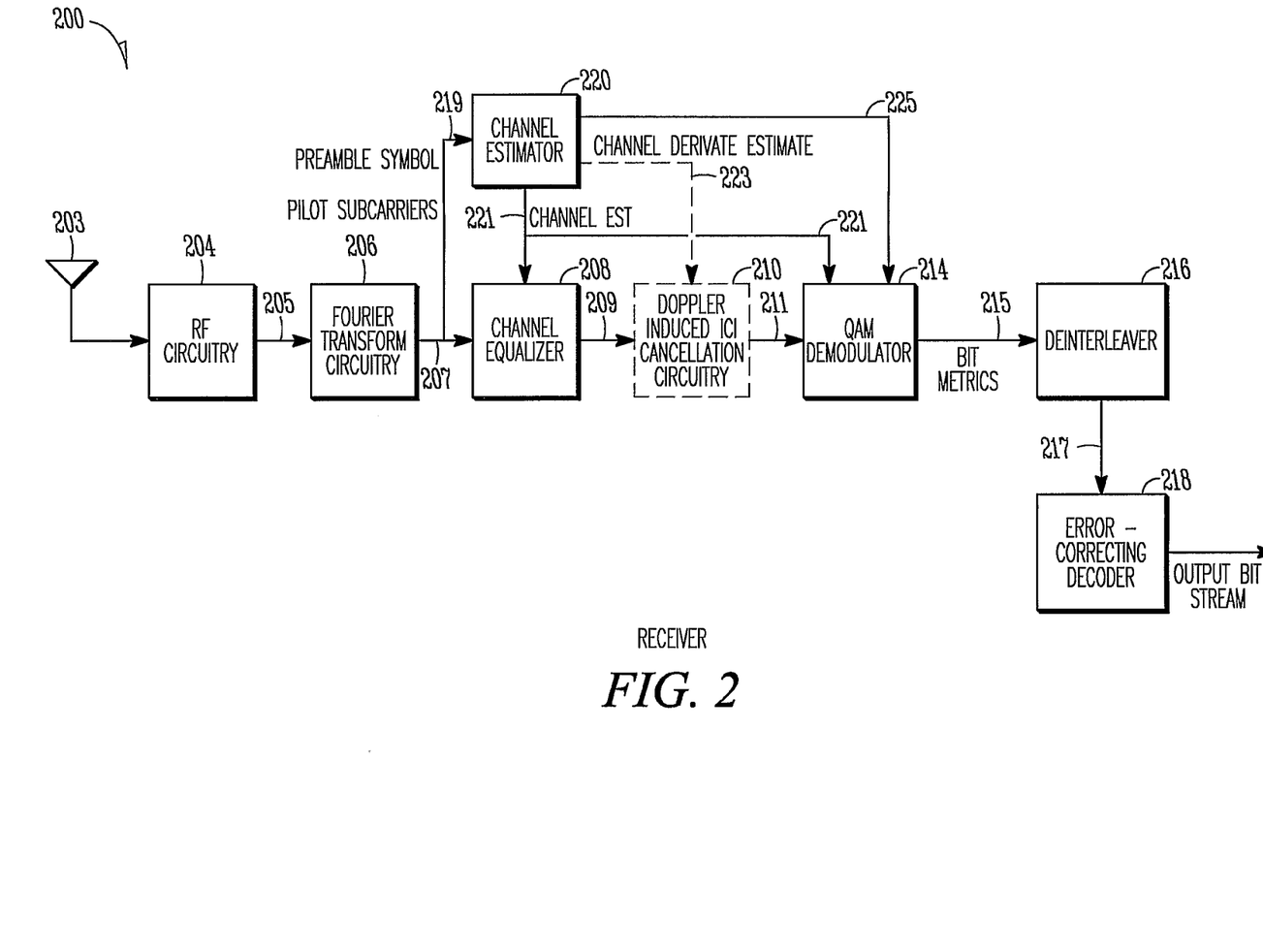
FIG. 2 is a functional block diagram of a multicarrier receiver in accordance with some embodiments of the present invention.

FIG. 2 is a functional block diagram of a multicarrier receiver in accordance with some embodiments of the present invention. Multicarrier receiver 200 may be suitable for use as a receiver portion of mobile station 102 (FIG. 1A), although other receiver configurations may also be suitable.

Multicarrier receiver 200 may include antenna 203 to receive multicarrier signals and radio-frequency (RF) circuitry 204 to downconvert and digitize the received signals. RF circuitry 204 may generate digital time-domain signals 205. Antenna 203 may correspond to antenna 103 (FIG. 1A & FIG. 1B) of mobile station 102 (FIG. 1A & FIG. 1B).

Multicarrier receiver 200 may also include Fourier transform circuitry 206 to perform a Fourier transform on digital time-domain signals 205 to generate frequency-domain signals 207. In some embodiments, Fourier transform circuitry 206 may provide one of frequency-domain signals 207 for each subcarrier of a received multicarrier communication signal. In some embodiments, Fourier transform circuitry 206 may perform a discrete Fourier transform (DFT), such as a fast Fourier transform (FFT), although the scope of the invention is not limited in this respect.

Multicarrier receiver 200 may also include channel estimator 220 to generate channel estimates 221 for each data subcarrier based on frequency-domain signals 207. In some embodiments, channel estimates 221 may comprise weights for each data subcarrier. Multicarrier receiver 200 may also include channel equalizer 208 to weight the subcarriers of frequency-domain signals 207 based on channel estimates 221 to generate channel-equalized frequency-domain signals 209 for each subcarrier. In accordance with some embodiments, the application of the weights by channel equalizer 208 may suppress interfering signals, particularly the transmissions from the most significant interfering base stations 106 (FIG. 1A) or transmissions from sectors of multi-sector base station 118 (FIG. 1B) as discussed above. In some embodiments, channel-equalized frequency-domain signals 209 may comprise a sub-symbol for each data subcarrier. In some embodiments, channel estimator 220 may generate channel estimates 221 for the main channel, channel estimates 225 for the interfering channels, and/or channel derivate estimate 223 from preamble symbols and pilot subcarriers of data symbols of received signal 219. Received signal 219 may comprise frequency-domain signals 207. The generation of channel estimates 221 by channel estimator 220 is discussed in more detail below.

In some embodiments, multicarrier receiver 200 may include Doppler-induced ICI cancellation circuitry 210 to reduce and/or substantially cancel Doppler-induced ICI from the received signals. In some embodiments, Doppler-induced ICI cancellation circuitry 210 may utilize channel derivative estimate 223. In some embodiments, Doppler-induced ICI cancellation circuitry 210 may generate frequency-domain signals 211 for each data subcarrier. Doppler-induced ICI cancellation circuitry 210 may be an optional element of multicarrier receiver 200. The reduction and/or cancellation of Doppler-induced ICI are discussed in more detail below.

Multicarrier receiver 200 may also include symbol demodulator 214 to demodulate subsymbols of frequency-domain signals 211 and generate bit-metrics 215 for each data subcarrier. In some embodiments, symbol demodulator 214 may be a quadrature-amplitude modulation (QAM) demodulator and the subsymbols of frequency-domain signals 211 may comprise a QAM symbol for each data subcarrier, although the scope of the invention is not limited in this respect. In some interference-aware embodiments, symbol demodulator 214 may use channel estimates 225 for interfering channels 107 (FIG. 1A) and channel estimates 221 for main channel 105 (FIG. 1A) to reduce and/or possibly eliminate the impact of the interfering channels on subsequently performed decoding operations.

Multicarrier receiver 200 may also include deinterleaver 216 to perform a deinterleaving operation on bit metrics 215 to generate deinterleaved bit metrics 217. In some embodiments, deinterleaver 216 may perform a block deinterleaving operation on blocks of bits, although the scope of the invention is not limited in this respect.

Multicarrier receiver 200 may also include error-correcting decoder 218 to perform an error-correction decoding operation on bit metrics 217 to generate a decoded output bit stream. In these embodiments, bit metrics 215 may represent probabilities, (e.g., soft-bits) rather than actual hard-bits which may be decoded using a soft-decision decoder. In these embodiments error-correcting decoder 218 may be a soft-decision decoder, such as a Viterbi decoder, although the scope of the invention is not limited in this respect. In these embodiments, the interference impact of the interfering channels may be decreased by symbol demodulator 214 which may take into account the various interfering values on the different subcarriers when generating bit metrics 215 to improve the error correcting decoding performed by decoder 218.

Although multicarrier receiver 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of multicarrier receiver 200 may refer to one or more processes operating on one or more processing elements.

In some embodiments, multicarrier receiver 200 may be part of a wireless communication device that may transmit and receive OFDMA communication signals over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. Each subcarrier may have a null at substantially a center frequency of the other subcarriers and/or each subcarrier may have an integer number of cycles within a symbol period, although the scope of the invention is not limited in this respect. In some other embodiments, multicarrier receiver 200 may communicate using spread-spectrum signals. In some embodiments, the frequency spectrums for the communication signals may comprise frequencies between 2 and 11 GHz, although the scope of the invention is not limited in this respect.

In some embodiments, multicarrier receiver 200 may be part of a broadband communication station that may operate within a BWA network, such as a Worldwide Interoperability for Microwave Access (WiMax) network, although the scope of the invention is not limited in this respect. In some embodiments, multicarrier receiver 200 may communicate in accordance with the IEEE 802.16-2004 and/or IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In some embodiments, multicarrier receiver 200 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antenna 203 may comprise one or more directional or omnidirectional antennas, including, for example, dipole antennas, monopole antennas, patch antennas, loop antennas, microstrip antennas or other types of antennas suitable for transmission of RF signals. In some embodiments, a single antenna with multiple apertures may be used to operate effectively as multiple antennas.

Figure 3:
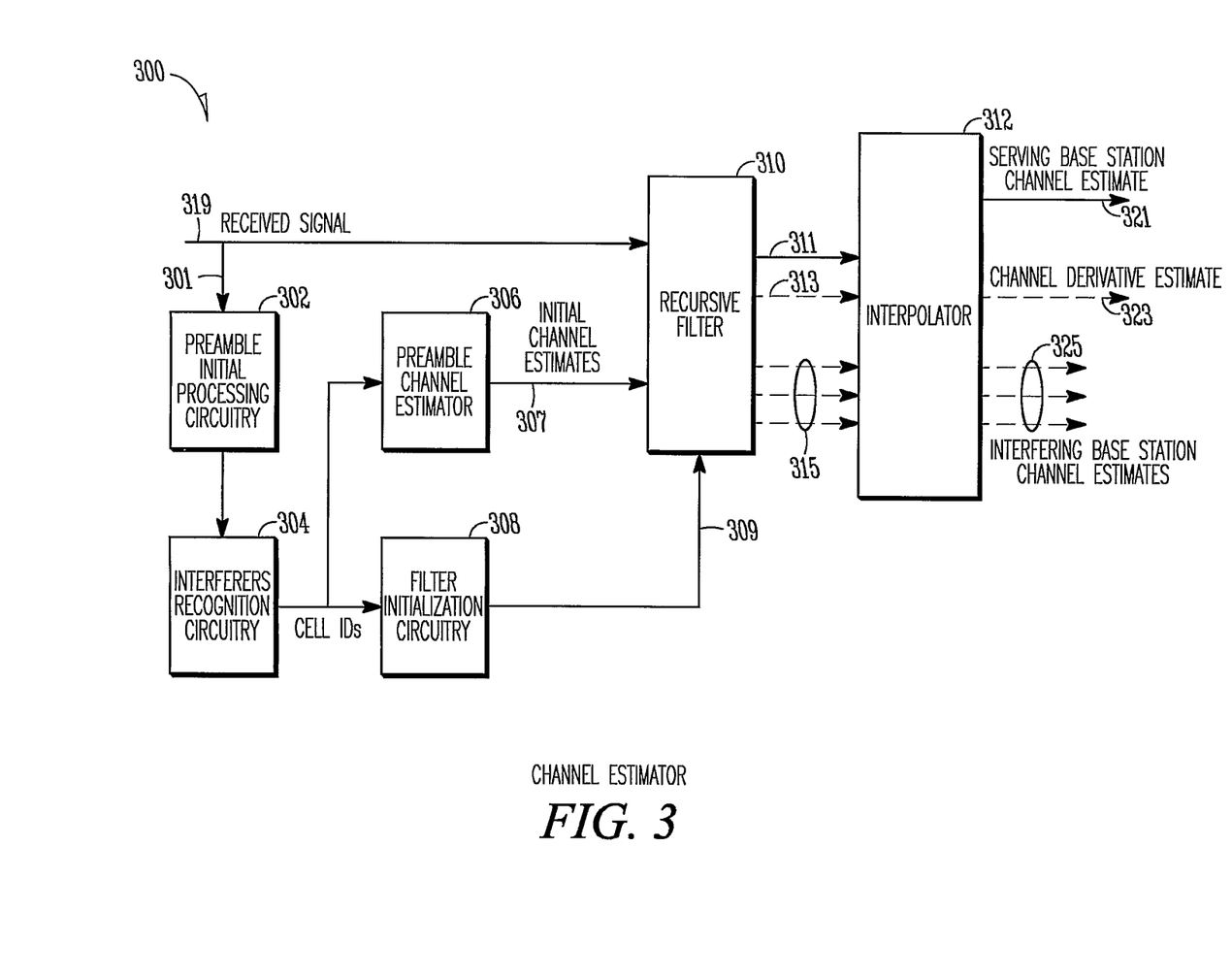
FIG. 3 is a block diagram of a channel estimator in accordance with some embodiments of the present invention.

FIG. 3 is a block diagram of a channel estimator in accordance with some embodiments of the present invention. Channel estimator 300 may be suitable for use as channel estimator 220 (FIG. 2), although other channel estimator configurations may also be suitable. In some embodiments, channel estimator 300 includes preamble initial processing circuitry 302, interferers recognition circuitry 304, preamble channel estimator 306, and filter initialization circuitry 308.

In some embodiments, channel estimator 300 also includes recursive filter 310 to generate channel estimates 311 for main channel 105 (FIG. 1A) and channel estimates 315 for one or more interfering channels 107 (FIG. 1A) based on pilot subcarriers within received signal 319. Recursive filter 310 may further generate channel estimates 311 and 315 using initial channel estimates 307 provided by preamble channel estimator 306 and initial state vector 309 provided by filter initialization circuitry 308. Initial state vector 309 may initialize recursive filter 310 and may include a filter order and pilot subcarrier modulation sequences for the main and the interfering channels. Channel estimates 311 and 315 may be channel estimates for the pilot subcarriers of a multicarrier communication signal. Received signal 319 may correspond to received signal 219 (FIG. 2).

Channel estimator 300 may also include interpolator 312 to interpolate channel estimates 311 for the pilot subcarriers to generate channel estimates 321 for the data subcarriers of main channel 105 (FIG. 1A). In some embodiments, interpolator 312 may interpolate channel estimates 315 to generate channel estimates 325 for one or more interfering channels 107 (FIG. 1A). In some embodiments, channel estimates 321 and 325 may comprise weights for each data subcarrier.

In some embodiments, recursive filter 310 may also generate channel derivative estimate 313. Channel derivate estimate 313 may be based on differences between the channel estimates of one or more sequential symbols to represent the rate of change of the channel estimates. Channel derivate estimate 323 may be provided by interpolator 312 and may be based on channel derivate estimate 313.

In some embodiments, preamble initial processing circuitry 302 identifies preamble symbol 301 from received signal 319. Interferers recognition circuitry 304 may identify one or more significant interfering base stations, such as interfering base stations 106 (FIG. 1A), from preamble symbol 301 and may extract seeds from the preamble identifiers (e.g., cell IDs) for use by filter initialization circuitry 308. Preamble channel estimator 306 may generate initial channel estimates 307 for main channel 105 (FIG. 1A) from preamble symbol 301. In some multi-sector embodiments, preamble channel estimator 306 may also generate initial channel estimates for one or more interfering channels 117 (FIG. 1B) from preamble symbols because the preamble symbols from different sectors may be transmitted by multi-sector base station 118 (FIG. 1B) on different subcarriers. Significant interferes may comprise interfering signals from another base station that exceed a predetermined interference threshold as determined by interferes recognition circuitry 304.

Filter initialization circuitry 308 may generate initial state vector 309 for recursive filter 310. Initial state vector 309 may include pilot subcarrier modulation sequences generated for the main and interfering channels from the extracted seeds. Initial state vector 309 may also include a number of orders allocated to the main channel and a number of orders allocated to the interfering channels. In some embodiments, filter initialization circuitry 308 may select the orders (i.e., dimensions) for recursive filter 310 based on a number of interfering base stations 106 (FIG. 1A) identified by interferers recognition circuitry 304. In some embodiments, filter initialization circuitry 308 may adaptively update the orders of recursive filter 310 when the number of interfering base stations 106 (FIG. 1A) changes, although the scope of the invention is not limited in this respect. In some embodiments, the orders of recursive filter 310 may be adaptively redistributed based on the number, strength, and/or importance of signals from interfering base stations 106 (FIG. 1A).

Recursive filter 310 may generate channel estimates 311 for the main channel and channel estimates 315 for the interfering channels by performing a symbol-by-symbol recursive process using initial state vector 309 and the pilot subcarriers of each data symbol from received signal 319. In some embodiments, recursive filter 310 may be a Kalman filter, although the scope of the invention is not limited in this respect. Some embodiments of the symbol-by-symbol recursive process are described in more detail below.

In some embodiments, interpolator 312 may perform a linear interpolation to generate data-subcarrier weights from pilot-subcarrier weights of channel estimates 311 and channel estimates 315. In some embodiments, interpolator 312 may perform an optimal weight calculation. In these embodiments, data-subcarrier weights may be calculated to suppress the most significant signals of interfering base stations 106 (FIG. 1A). In some embodiments, interpolator 312 may apply a zero-forcing (ZF) algorithm to calculate data-subcarrier weights, while in other embodiments, interpolator 312 may apply a minimum mean squared error (MMSE) algorithm to calculate data-subcarrier weights, although the scope of the invention is not limited in these respects.

Although channel estimator 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of channel estimator 300 may refer to one or more processes operating on one or more processing elements.

Figure 4:
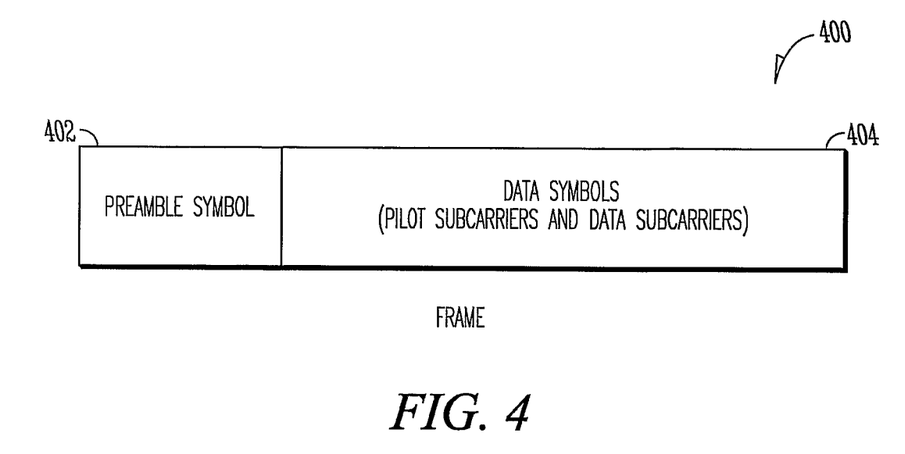
FIG. 4 illustrates a downlink frame in accordance with some embodiments of the present invention.

FIG. 4 illustrates a downlink frame in accordance with some embodiments of the present invention. Downlink frame 400 comprises preamble symbol 402 and one or more data symbols 404. Preamble symbol 402 may correspond to preamble symbol 301 (FIG. 3) and may include, among other things, a preamble identifier from each transmitting base station and an associated seed for generating the subcarrier modulation sequence for the associated base station. Data symbols 404 may comprise pilot subcarriers corresponding to pilot subcarriers which may be processed by recursive filter 310 (FIG. 3) and data subcarriers which may be processed by channel equalizer 208 (FIG. 2). In some embodiments, downlink frame 400 may be an OFDMA frame, and preamble symbol 402 and data symbols 404 may comprise OFDMA symbols. Although frame 400 is described as a downlink frame transmitted from a base station to a mobile station, the scope of the invention is not limited in this respect as some embodiments of the present invention are equally applicable to uplink transmissions.

Referring to FIGS. 1A, 1B, 2, 3, and 4, in accordance with some embodiments, recursive filter 310 may perform symbol-by-symbol recursive filtering on pilot subcarriers of received signal 319 to generate channel estimates 311 for a main channel. Filter initialization circuitry 308 may allocate two or more orders dimensions of recursive filter 310 to track main channel 105 with serving base station 104, and may allocate additional orders of recursive filter 310 to track the most significant one or more interfering channels 107. In these embodiments, recursive filter 310 may apply a pilot subcarrier modulation sequence for the serving base station and a pilot subcarrier modulation sequence for the interfering base stations to generate channel estimates on a symbol-by-symbol basis for the main channel for each of the pilot subcarriers.

In some embodiments, when recursive filter 310 is a Kalman filter, the number of orders of the Kalman filter may be fixed or predetermined. In some embodiments, the channel may be modeled by recursive filter 310 as a fourth-order channel. In these embodiments, when two significant interfering base stations 106 are identified, two orders of recursive filter 310 may be allocated to main channel 105 and one order may be allocated to each of interfering channels 107, although the scope of the invention is not limited in this respect. In some embodiments, when one significant interfering base station is identified, three orders of recursive filter 310 may be allocated to the main channel and one order may be allocated to the interfering channel, although the scope of the invention is not limited in this respect. As used herein, the orders of recursive filter 310 may refer to the number of matrix dimensions in which recursive filter 310 is configured to process.

In some embodiments, recursive filter 310 uses a pilot subcarrier modulation sequence associated with serving base station 104 to generate symbol-by-symbol channel estimates 311 for main channel 105. Recursive filter 310 may also use pilot subcarrier modulation sequences associated with interfering base stations 106 to generate symbol-by-symbol channel estimates 315 for interfering channels 107. In these embodiments, each interfering base station 106 may be associated with one of interfering channels 107, and serving base station 104 may be associated with main channel 105.

In some embodiments, interferers recognition circuitry 304 may initially identify one or more interfering base stations 106 from a base station identifier (BS ID) or a cell ID within a received preamble symbol 402. Preamble symbol 402 may comprise substantially time-synchronized OFDM transmissions by serving base station 104 and one or more interfering base stations 106. In these embodiments, filter initialization circuitry 308 may initialize recursive filter 310 by allocating a number of orders to track main channel 105 based on a number of interfering base stations 106 identified. In some embodiments, the transmissions from one of interfering base stations 106 may be selected for interference cancellation based on the signal level that base station's preamble symbol 402 and/or the ability of receiver 200 to identify the particular interfering base station from preamble symbol 402, although the scope of the invention is not limited in this respect. In these embodiments, each base station may include a different base station identifier or cell ID within preamble symbol 402 that each base station transmits. In some embodiments, serving base station 104 and interfering base stations 106 may each synchronously transmit preamble symbol 402 on the same predetermined set of subcarriers. In some embodiments, preamble symbol 402 may comprise known QAM symbols. Each frame 400 may begin with preamble symbol 402 allowing mobile station 102 to time-synchronize with frame 400 and initially correct for coarse frequency offset, among other things.

In some multi-sector base station embodiments, multi-sector base station 118 may include a different base station identifier or cell ID within preamble symbol 402 transmitted within each sector. In these multi-sector embodiments, multi-sector base station 118 may use different subcarriers for the preamble symbol in the different sectors.

In some embodiments, recursive filter 310 may be initialized to have four orders (i.e., operate with four-dimensional matrices). When one interfering base station 106 is identified as a significant interferer, filter initialization circuitry 308 may allocate three of the four orders of recursive filter 310 to track main channel 105, and may allocate one of the four orders to track one of interfering channels 107. When two interfering base stations 106 are identified as significant interferers, filter initialization circuitry 308 may allocate two of the four orders of recursive filter 310 to track main channel 105, and may allocate two of the four orders to track interfering channels 107 associated with the two identified interfering base stations 106.

In some embodiments, filter initialization circuitry 308 may generate a pilot subcarrier modulation sequence for serving base station 104 from a seed extracted from components of preamble symbol 402 associated with serving base station 104. In these embodiments, filter initialization circuitry 308 may also generate pilot subcarrier modulation sequences for one or more interfering base stations 106 from one or more seeds extracted from components of preamble symbol 402 associated with each of the interfering base stations 106. In these embodiments, serving base station 104 and interfering base stations 106 may operate substantially synchronously by concurrently transmitting downlink preamble symbol 402.

In some embodiments, recursive filter 310 performs symbol-by-symbol recursive filtering for each symbol of an OFDM frame. In these embodiments, recursive filter 310 performs a gain update for a current symbol using received (i.e., observed) pilot subcarriers from serving base station 104 and one or more interfering base stations 106. In these embodiments, recursive filter 310 may update a channel estimate for the current symbol using a channel estimate for a prior symbol, the gain update, and the received pilot subcarriers.

In some interference-aware embodiments, symbol demodulator 214 may apply channel estimates 221 for main channel 105 and channel estimates 225 for the one or more interfering channels 107 during QAM symbol demodulation to generate bit metrics 215 for each subcarrier. In these embodiments, bit metrics 215 may represent probabilities for predetermined bit values (e.g., a one or a zero) influenced by both the channel estimates for the main channel and the channel estimates for the interfering channels. In some embodiments, bit metrics 215 may comprise log-likelihood metrics, although the scope of the invention is not limited in this respect.

In some embodiments, receiver 200 may, at least in part, cancel Doppler-induced ICI. In these embodiments, channel derivate estimate 223 may be based on differences between the channel estimates for sequential symbols of frame 400. Doppler-induced ICI cancellation circuitry 210 may apply channel derivate estimate 223 to channel-equalized frequency-domain signals 209 for each subcarrier to reduce or substantially cancel Doppler-induced ICI between the subcarriers. In these embodiments, Doppler-induced ICI for a particular subcarrier may depend on channel variation speed and the influence of adjacent subcarriers. In these embodiments, channel derivative estimate 223 may be a first derivative of the channel transfer function and may represent a measure of the channel variation over time allowing Doppler-induced ICI to be calculated and substantially cancelled.

Some conventional interference cancellation techniques use a directly estimated interference correlation matrix at each subcarrier. Direct estimation of the interference correlation matrix at each subcarrier may be a difficult and computationally complex task. In accordance with some embodiments of the present invention, interference cancellation may be based on channel estimates of the interfering channels (e.g., channels 107 or channels 117) rather than a direct estimation of the interference correlation matrix.

Because neighboring base stations of a wireless network may operate synchronously, the pilot subcarriers of a serving base station may be affected by the pilot subcarriers of the neighboring base stations because the pilot subcarriers of the neighboring base stations use the same frequency subcarriers as the serving base station. As discussed above, each base station, however, may modulate different sets of pilot subcarriers with pilot subcarrier modulation sequences. In some embodiments, the pilot subcarrier modulation sequences may comprise pseudo-random binary sequences (PRBSs), although the scope of the invention is not limited in this respect. As discussed above, multi-sector base station 118 may modulate the pilot subcarriers used in each sector with different pilot subcarrier modulation sequences. In some embodiments, information about each pilot subcarrier modulation sequence may be determined from an identifier which may be included in a frame header and/or from preamble symbol 402 using the preamble processing techniques discussed above. For example, preamble symbol 402 of each base station 104 and 106 may include a base station identifier or cell ID from which a seed may be extracted. The seed may be used to seed an algorithm to generate the particular subcarrier modulation sequence used by the base station that transmitted the preamble symbol. The pilot subcarrier modulation sequence of serving base station 104 may be used for channel estimation of main channel 105 by mobile station 102. In accordance with some embodiments, the pilot subcarrier modulation sequences of interfering base stations 106 may be used by channel estimator 220 to calculate an interference correlation matrix through estimating the interfering channels for the purpose of further interference cancellation.

In accordance with some embodiments, the received signal at a particular pilot subcarrier may be expressed as:

$$x_r(k) = H_m(k)p_m(k) + \sum_{i=1}^{N_{int}} H_i(k)p_i(k) + n(k) \qquad (1)$$

where $x_r(k)$ is a received signal vector of size $1 \times N_{int}$ at antenna 103 at the $k^{th}$ symbol, $p_m(k)$ represents the pilot values for serving base station 104, $p_i(k)$ represents the pilot values for interfering base stations 106, and $n(k)$ is residual noise which may be modeled as additive white Gaussian noise (AWGN). The residual noise may include background receiver noise and weak interferers. In Equation (1), $H_m$ is a vector representing the channel transfer function for main channel 105, and $H_i$ (for i=1 ... $N_{int}$) is a vector representing the channel transfer functions for interfering channels 107 from interfering base stations 106 to mobile station 102. $N_{int}$ represents the number of interfering base stations 106 that are identified as significant interferers by interferers recognition circuitry 304.

In accordance with some embodiments, a state-space dynamic model of the channel transfer function may be used by recursive filter 310 to estimate main channel 105 and interfering channels 107 simultaneously. The recursive filtering performed by recursive filter 310 may include matrix processing operations. These matrix processing operations may be more computationally intensive for higher filter orders. Therefore, in some embodiments, the orders of recursive filter 310 may be selected by filter initializing circuitry 308 based on a minimum number of interfering base stations. In some embodiments, the orders of recursive filter 310 may be predetermined or fixed at a predetermined number such as four, although the scope of the invention is not limited in this respect.

In accordance with some embodiments, the orders of recursive filter 310 may be adaptively redistributed between serving base station 104 (FIG. 1A) and interfering base stations 106 (FIG. 1A) in accordance to their relative importance and strength. For example, when recursive filter 310 is a fourth-order filter, the channels from serving base station 104 (FIG. 1A) and interfering base stations 106 (FIG. 1A) may be modeled as a 2+2 configuration by recursive filter 310 in accordance with the following equations in which two orders are allocated to the main channel and two orders are allocated to one of the interfering channels:

$$H_m(k+1)=H_m(k)+\dot{H}_m(k)+\xi(k)$$

$$H_i(k+1)=H_i(k)+\dot{H}_i(k)+\zeta(k) \qquad (2)$$

In Equations (2), $H_m(k)$ represents the channel transfer function representing the channel estimates for main channel 105 (FIG. 1A) for the $k^{th}$ symbol, $H_i(k)$ represents the channel estimates for an interfering channel (e.g., the strongest one of interfering channels 107 (FIG. 1A)) for the $k^{th}$ symbol, and $\zeta(k)$ and $\xi(k)$ may represent the model noise, which may describe stochastic channel behaviour and may represent a discrepancy between the model and real channel dynamics. $\dot{H}_m$, read Hdot, represents the derivative of the channel transfer function and may be calculated from the expression $\dot{H}_m(k) = H(k) - H(k-1)$. In accordance with some embodiments, first and even higher-order derivatives may be used to describe smooth or rapidly changing channels.

In some embodiments, the channels from serving base station 104 (FIG. 1A) and interfering base stations 106 (FIG. 1A) may be modeled as a 3+1 configuration by recursive filter 310 in which three orders are allocated to track main channel 105 and one order is allocated to track the interfering channel associated with the strongest interfering base station. In these embodiments, the following equations may be used by recursive filter 310 to track the channel estimates:

$$H_m(k+1) = H_m(k) + \dot{H}_m(k) + \frac{1}{2}\ddot{H}_m(k) + \xi_m(k) \qquad (3)$$

$$H_i(k+1) = H_i(k) + \xi_i(k).$$

In Equations (3), the H with two dots above represents the second derivative of the channel estimate.

In some embodiments when two strong interfering base stations are identified, the channels from serving base station 104 (FIG. 1A) and interfering base stations 106 (FIG. 1A) may be modeled as a 2+1+1 configuration by recursive filter 310 in which two orders may be allocated to track main channel 105 and two orders may be allocated to track the two interfering channels associated with the two strongest interfering base stations. In these embodiments, the following equations may be used by recursive filter 310 to track the channel estimates:

$$H_m(k+1)=H_m(k)+\dot{H}_m(k)+\xi_m(k)$$

$$H_{i1}(k+1)=H_{i1}(k)+\xi_{i1}(k)$$

$$H_{i2}(k+1)=H_{i2}(k)+\xi_{i2}(k)$$

In some embodiments, the channel parameters (e.g., $H_m$, $H_i$, $\dot{H}_m$) may be combined into an extended state vector H. A state-space model of the channel and the received signal may be expressed as follows:

$$H(k+1)=FH(k)+w(k)$$

$$x(k)=p^T(k)H(k)+n(k). \qquad (4)$$

In Equations (4), F represents a transition matrix of ones which may be different for different filter orders and configurations. Equations (4) represent, respectively, the state-space model and the observation model that in some embodiments may be used by filter initialization circuitry 308 to configure recursive filter 310 to perform channel transfer function estimation. In these embodiments, the recursive process for channel estimation described below may be performed on a persymbol basis. In these embodiments, recursive filter 310 may be configured with the following initial conditions:

$H(0)=H_{preamble}$, which may be an initial channel estimate generated from preamble symbol 402 by preamble channel estimator 306;

$V_H$, which represents an a priori estimate covariance;

$V_n$, which represents an observation additive noise covariance; and $V_w$, which represents a signal model noise covariance.

In some embodiments, the symbol-by-symbol recursive filtering performed by recursive filter 310 may include the following operations:

$K(j)=V_H(j|j-1)p(j)[p(j)^T V_H(j|j-1)p(j)+V_n]^{-1}$, which describes performing a gain update;

$H(j+1)=FH(j)+K(j)[x(j)-p(j)^T FH(j)]$, which describes generating a channel estimate update;

$V_H(j)=[I-H(j)K(j)]V_H(j|j-1)$, which describes generating an a posteriori estimate covariance matrix for the current symbol; and $V_H(j+1|j)=FV_H(j)F^T+V_w$, which predicts an a priori estimate covariance matrix for the next symbol.

From the above symbol-by-symbol operations, the channel estimates for main channel 105 (FIG. 1A) and interfering channels 107 (FIG. 1A) may also be used to generate data subcarrier weights for application to frequency-domain signals 207 by channel equalizer 208. From the above symbol-by-symbol operations, the channel estimates for main channel 105 (FIG. 1A) and interfering channels 107 (FIG. 1A) may also be used to generate a signal to interference and noise value (SINR) estimate for use in some interference-aware embodiments of the present invention. In these embodiments, the SINR may be calculated by demodulator 214 based on the following equation:

$$SINR = \frac{\hat{H}_m^2}{\hat{H}_i^2 + \hat{\sigma}_n^2}$$

In this equation, $\hat{H}$ represents estimates of the channel transfer functions for the main and interfering base stations, $\hat{H}^2$ may be proportional to the signal power, and a represents receiver noise. In these interference-aware embodiments, demodulator 214 may use the SINR in generating bit metrics 215 as described above. The SINR values generated by the above equation may be generated "on the fly" using the symbol-by-symbol pilot subcarrier processing operations described above. This is unlike some conventional OFDM receivers which require long-term (e.g., over several OFDM symbols or even frames) interference estimation and feedback data processing.

Figure 5:
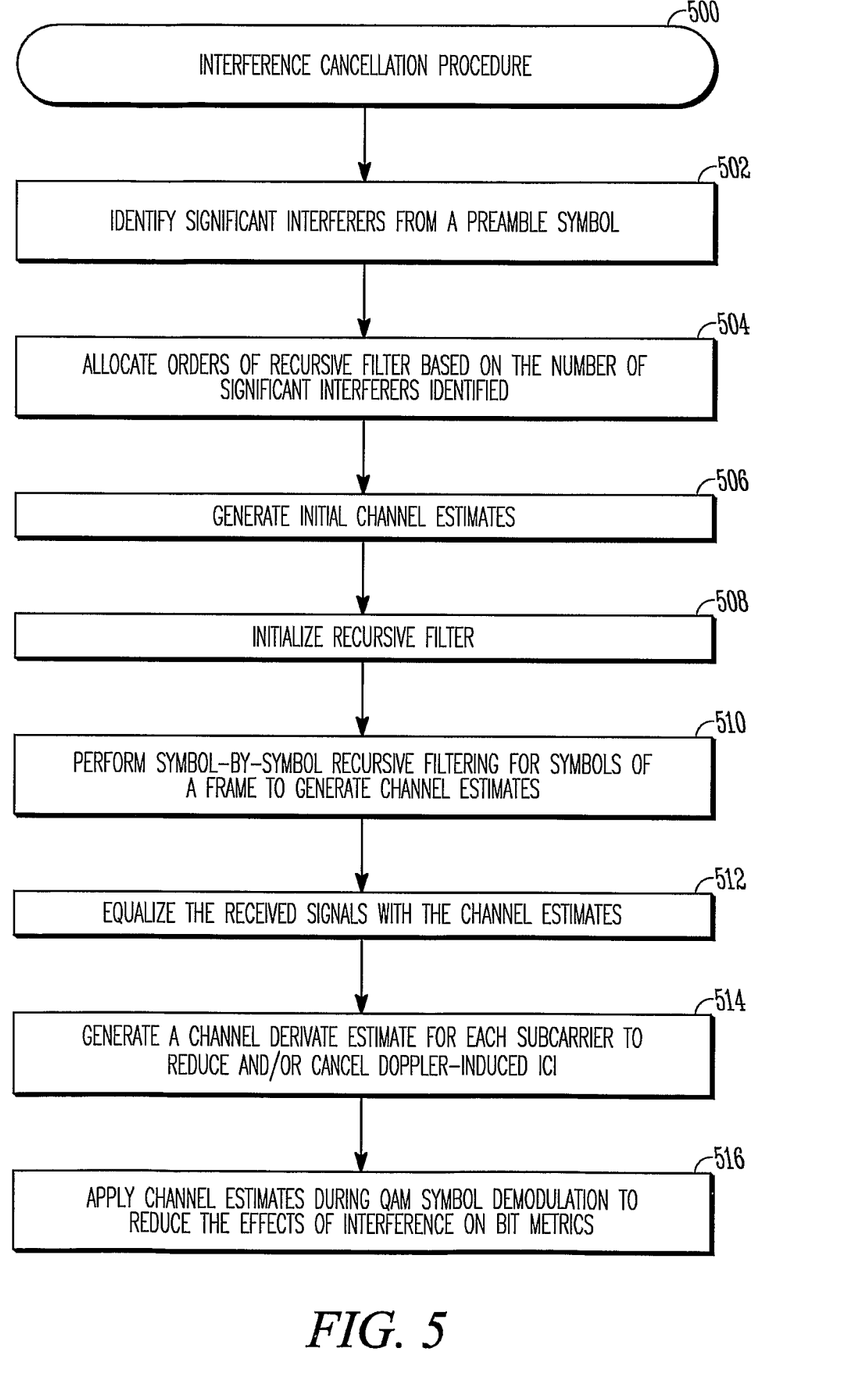
FIG. 5 is a flow chart of an interference cancellation procedure in accordance with some embodiments of the present invention.

FIG. 5 is a flow chart of an interference cancellation procedure in accordance with some embodiments of the present invention. Interference cancellation procedure may be performed by multicarrier receiver 200 (FIG. 2) to reduce and/or cancel interference, including interference from interfering base stations and in some embodiments, Doppler-induced ICI, although the scope of the invention is not limited in this respect.

Operation 502 identifies significant interferers from a preamble symbol. In some embodiments, interferers recognition circuitry 304 (FIG. 3) may identify interfering base stations from a preamble symbol. In some embodiments, interferers recognition circuitry 304 (FIG. 3) may identify significant interferes as interfering signals from another base station that exceed a predetermined interference threshold.

Operation 504 allocates orders of a recursive filter based on the number of significant interferers identified in operation 502. In some embodiments, the number of orders of the recursive filter may be predetermined, and two or more orders may be allocated to track the main channel and the remaining orders may be allocated to track the significant interferers. In some embodiments, operation 504 may include generating pilot subcarrier modulation sequences for the interfering base stations identified as significant interferers. In some embodiments, filter initialization circuitry 308 (FIG. 3) may perform operation 504.

Operation 506 generates initial channel estimates from the received preamble symbol. In some embodiments, preamble channel estimator 306 (FIG. 3) may generate an initial channel estimate for the main channel. In some multi-sector embodiments, operation 506 may include generating initial channel estimates for the interfering channels from the preamble symbol, although the scope of the invention is not limited in this respect.

Operation 508 comprises initializing a recursive filter, such as recursive filter 310 (FIG. 3). In some embodiments, the recursive filter may be initialized with the number of orders allocated to track the main channel and the number of orders allocated to track interfering channels. The recursive filter may also be initialized with initial channel estimates from operation 506. In some embodiments, the recursive filter may be provided with pilot subcarrier modulation sequences generated for the interfering base stations identified as significant interferers from operation 504.

Operation 510 comprises performing symbol-by-symbol recursive filtering for symbols of a frame to generate channel estimates for the main channel and one or more interfering channels. In some embodiments, operation 510 may be performed by recursive filter 310 (FIG. 3) using the equations described above.

Operation 512 comprises equalizing the received signals with the channel estimates for the main channel. Operation 512 may include applying weights to frequency-domain signals 207 (FIG. 2) and may include interpolating pilot subcarrier channel estimates 311 (FIG. 3) to generate data subcarrier channel estimates 321 (FIG. 3).

Operation 514 may include generating a channel derivative estimate for each subcarrier and applying the channel derivative estimates to reduce and/or cancel Doppler-induced ICI. In some embodiments, the channel derivative estimate may be generated during operation 510. In some embodiments, Doppler-induced ICI cancellation circuitry 210 (FIG. 2) may apply the channel derivative estimate to channel equalized frequency-domain signals, although the scope of the invention is not limited in this respect.

Operation 516 comprises applying the channel estimates during QAM symbol demodulation to reduce the effects to interference on bit metrics. Operation 516 may be performed in interference-aware embodiments, and may help reduce the effects of interference from interfering base stations on the bit metrics. In some embodiments, operation 516 may be performed by demodulator 214 (FIG. 2), which may be a QAM symbol demodulator, although the scope of the invention is not limited in this respect.

Although the individual operations of procedure 500 are illustrated and described as separate operations, one or more of the individual operations may be performed concurrently, and nothing requires that the operations be performed in the order illustrated. Operations 514 and 516 are optional, although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method of generating channel estimates performed by an Orthogonal Frequency Division Multiple Access (OFDMA) receiver of a mobile station, the method comprising: initially identifying a serving base station and one or more interfering base stations from base station identifiers contained within preamble symbols, the preamble symbols comprising OFDMA transmissions transmitted by the base stations; allocating two or more orders of a recursive filter to a main channel associated with the serving base station and allocating additional orders of the recursive filter to one or more interfering channels associated with the interfering base stations; and performing symbol-by-symbol recursive filtering with the recursive filter on one or more pilot subcarriers of received symbols of an OFDMA frame using a pilot subcarrier modulation sequence associated with the serving base station and pilot subcarrier modulation sequences associated with the one or more interfering base stations to generate channel estimates on a symbol-by-symbol basis for the main channel and the one or more interfering channels; wherein the recursive filter is a Kalman filter initialized to have four orders, wherein when one interfering base station is identified as an interferer, the method comprises: allocating three of the four orders of the recursive filter to track the main channel; and allocating one of the four orders of the recursive filter to track an interfering channel associated with the one interfering base station, and wherein when two interfering base stations are identified as interferers, the method comprises: allocating two of the four orders of the recursive filter to track the main channel; and allocating two of the four orders of the recursive filterer to track interfering channels associated with the two identified interfering base stations.

2. The method of claim 1 wherein performing the symbol-by-symbol recursive filtering using the pilot subcarrier modulation sequence associated with the serving base station and the pilot subcarrier modulation sequences associated with the one or more interfering base stations generates symbol-by-symbol channel estimates for the main channel and the one or more interfering channels.

3. The method of claim 2 wherein the preamble symbols comprise substantially time-synchronized OFDMA transmissions by the serving base station and the one or more interfering base stations; and
   wherein the method includes initializing the recursive filter by allocating a number of orders to track the main channel based on a number of the interfering base stations identified.

4. The method of claim 3 further comprising:
   generating the pilot subcarrier modulation sequence for the serving base station from a seed extracted from components of the preamble symbol associated with the serving base station; and
   generating the pilot subcarrier modulation sequences for the one or more interfering base stations from one or more seeds extracted from components of the preamble symbol associated with each of the interfering base stations,
   wherein the serving base station and the one or more interfering base stations operate substantially synchronously by concurrently transmitting preamble symbols.

5. The method of claim 1 wherein performing the symbol-by-symbol recursive filtering comprises, for each symbol of an orthogonal frequency division multiple access (OFDMA) frame,
   performing a gain update for a current symbol using received pilot subcarriers from a serving base station and one or more interfering base stations;
   updating a channel estimate for the current symbol using a channel estimate for a prior symbol, the gain update and the received pilot subcarriers.

6. The method of claim 5 wherein the symbol-by-symbol recursive filtering further comprises generating channel estimates for the one or more interfering channels, and
   wherein the method further comprises applying the channel estimate for the main channel and the channel estimates for the one or more interfering channels during symbol demodulation to generate bit metrics for each subcarrier, the bit metrics representing probabilities for predetermined bit values influenced by both the channel estimate for the main channel and the channel estimates for the one or more interfering channels.

7. The method of claim 1 further comprising:
   generating a channel derivate estimate based on differences between channel estimates for sequential symbols of a frame;
   applying the channel derivate estimate to channel-equalized frequency-domain signals to reduce Doppler-induced inter-carrier interference between the subcarriers.

8. The method of claim 1 further comprising:
   generating an initial channel estimate for the main channel from the preamble symbol; and initializing the recursive filter with the initial channel estimate for the main channel.

9. The method of claim 8 wherein when interfering base stations and a serving base station transmit preamble symbols on different subcarriers, the method further comprises:
generating initial channel estimates for the one or more interfering channels using the preamble symbols transmitted on the different subcarriers; and
initializing the recursive filter with the initial channel estimate for the one or more interfering channels.

10. The method of claim 1 further comprising generating an initial state vector for the recursive filter that includes the pilot subcarrier modulation sequences for the main and interfering channels, the initial state vector to further include a number of orders allocated to the main channel and a number of orders allocated to the interfering channels.

11. The method of claim 1 wherein the orders of the recursive filter refer to a number of matrix dimensions in which the recursive filter is configured to process,
wherein the main and interfering channels are distinguishable based on their respective pilot subcarrier modulation sequences.

12. A multicarrier receiver comprising: a recursive filter to perform symbol-by-symbol recursive filtering on pilot subcarriers of received symbols of an Orthogonal Frequency Division Multiple Access (OFDMA) frame to generate channel estimates for a main channel; an interferers recognition circuitry to initially identify a serving base station and one or more interfering base stations from base station identifiers contained within preamble symbols, the preamble symbols comprising OFDMA transmissions transmitted by the base stations; and a filter initialization circuitry to allocate two or more orders of the recursive filter to the main channel associated with the serving base station and to allocate additional orders of the recursive filter to one or more interfering channels associated with the interfering base stations, wherein during the symbol-by-symbol recursive filtering, the recursive filter applies a pilot subcarrier modulation sequence for the serving base station and pilot subcarrier modulation sequences for the interfering base stations to generate channel estimates on a symbol-by-symbol basis for the main channel and the one or more interfering channels; wherein the recursive filter is a Kalman filter initialized to have four orders, wherein when one interfering base station is identified as an interferer, the filter initialization circuitry allocates three of the four orders of the recursive filter to track the main channel, and allocates one of the four orders of the recursive filter to track an interfering channel associated with the one interfering base station, and wherein when two interfering base stations are identified as interferers, the filter initialization circuitry allocates two of the four orders of the recursive filter to track the main channel, and allocates two of the four orders of the recursive filter to track interfering channels associated with the two identified interfering base stations.

13. The multicarrier receiver of claim 12 wherein the recursive filter uses the pilot subcarrier modulation sequence associated with the serving base station and the pilot subcarrier modulation sequences associated with the one or more interfering base stations to generate symbol-by-symbol channel estimates for the main channel and the one or more interfering channels.

14. The multicarrier receiver of claim 13 wherein the recursive filter and the filter initialization circuitry are part of a channel estimator,
wherein the preamble symbols comprise substantially time-synchronized orthogonal-frequency division multiple access (OFDMA) transmissions by the serving base station and the one or more interfering base stations,
wherein the filter initialization circuitry initializes the recursive filter by allocating a number of orders to track the main channel based on a number of the interfering base stations identified.

15. The multicarrier receiver of claim 14 wherein the filter initialization circuitry generates the pilot subcarrier modulation sequence for the serving base station from a seed extracted from components of the preamble symbol associated with the serving base station, and generates the pilot subcarrier modulation sequences for the one or more interfering base stations from one or more seeds extracted from components of the preamble symbol associated with each of the interfering base stations,
wherein the serving base station and the one or more interfering base stations operate substantially synchronously by concurrently transmitting preamble symbols.

16. The multicarrier receiver of claim 12 wherein the recursive filter performs the symbol-by-symbol recursive filtering for each symbol of an orthogonal frequency division multiple access (OFDMA) frame,
wherein the recursive filter performs a gain update for a current symbol using received pilot subcarriers from the serving base station and the one or more interfering base stations, and
wherein the recursive filter updates a channel estimate for the current symbol using a channel estimate for a prior symbol, the gain update and the received pilot subcarriers.

17. The multicarrier receiver of claim 16 wherein the recursive filter generates channel estimates for the one or more interfering channels, and
wherein the multicarrier receiver further comprise a symbol demodulator to apply the channel estimate for the main channel and the channel estimates for the one or more interfering channels during symbol demodulation to generate bit metrics for each subcarrier, the bit metrics representing probabilities for predetermined bit values influenced by both the channel estimate for the main channel and the channel estimates for the one or more interfering channels.

18. The multicarrier receiver of claim 12 wherein the channel estimator further generates a channel derivate estimate based on differences between the channel estimates for sequential symbols of a frame, and
wherein the multicarrier receiver further comprises Doppler-induced intercarrier interference cancellation circuitry to apply the channel derivate estimate to channel-equalized frequency-domain signals to reduce Doppler-induced inter-carrier interference between the subcarriers.

19. The multicarrier receiver of claim 12 wherein the channel estimator comprises a preamble channel estimator to generate an initial channel estimate for the main channel from the preamble symbol, and
wherein the filter initialization circuitry initializes the recursive filter with the initial channel estimate for the main channel.

20. The multicarrier receiver of claim 19 wherein when the interfering base stations and the serving base station transmit preamble symbols on different subcarriers, the preamble channel estimator generates initial channel estimates for the one or more interfering channels using the preamble symbols transmitted on the different subcarriers and the filter initialization circuitry initializes the recursive fitter with the initial channel estimate for the one or more interfering channels.

21. The multicarrier receiver of claim 12 wherein the filter initialization circuitry is configured to generate an initial state vector for the recursive filter that includes the pilot subcarrier modulation sequences for the main and interfering channels, the initial state vector to further include a number of orders allocated to the main channel and a number of orders allocated to the interfering channels.

22. The multicarrier receiver of claim 12 wherein the orders of the recursive filter refer to a number of matrix dimensions in which the recursive filter is configured to process,
   wherein the main and interfering channels are distinguishable based on their respective pilot subcarrier modulation sequences.

\* \* \* \* \*

UNITED STATES PATENT AND TRADEMARK OFFICE
CERTIFICATE OF CORRECTION

PATENT NO. : 8,428,158 B2  
APPLICATION NO. : 12/281049  
DATED : April 23, 2013  
INVENTOR(S) : Maltsev et al.

Page 1 of 1

It is certified that error appears in the above-identified patent and that said Letters Patent is hereby corrected as shown below:

In the Claims

In column 15, line 47-48, in Claim 1, after "comprising:", insert --¶--, therefor In column 15, line 52, in Claim 1, after "stations;", insert --¶--, therefor In column 15, line 56, in Claim 1, after "and", insert --¶--, therefor In column 15, line 63, in Claim 1, after "channels;", insert --¶--, therefor In column 15, line 66, in Claim 1, after "comprises:", insert --¶--, therefor In column 16, line 1, in Claim 1, after "and", insert --¶--, therefor In column 16, line 3, in Claim 1, after "and", insert --¶--, therefor In column 16, line 4, in Claim 1, after "comprises:", insert --¶--, therefor In column 16, line 6, in Claim 1, after "and", insert --¶--, therefor In column 17, line 14, in Claim 10, after "vector", delete "to", therefor In column 17, line 24, in Claim 12, after "comprising:", insert --¶--, therefor In column 17, line 28, in Claim 12, after "channel;", insert --¶--, therefor In column 17, line 33, in Claim 12, after "and", insert --¶--, therefor In column 17, line 43, in Claim 12, after "channel;", insert --¶--, therefor In column 19, line 1, in Claim 20, delete "fitter" and insert --filter--, therefor In column 19, line 7, in Claim 21, after "vector", delete "to", therefor Signed and Sealed this  
First Day of April, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,428,158 B2  
APPLICATION NO. : 12/281049  
DATED : April 23, 2013  
INVENTOR(S) : Maltsev et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this
Eighth Day of September, 2015

Michelle K. Lee
*Director of the United States Patent and Trademark Office*